United States Patent
Barois et al.

(10) Patent No.: US 12,342,178 B2
(45) Date of Patent: Jun. 24, 2025

(54) METHOD FOR DETECTING NEIGHBOURING NODES ABLE TO COMMUNICATE BY POWERLINE AND BY A RADIO CHANNEL

(71) Applicant: SAGEMCOM ENERGY & TELECOM SAS, Rueil Malmaison (FR)

(72) Inventors: Jérôme Barois, Rueil Malmaison (FR); Guillaume Bacri, Rueil Malmaison (FR)

(73) Assignee: SAGEMCOM ENERGY & TELECOM SAS, Bois-Colombes (FR)

(*) Notice: Subject to any disclaimer, the term of this patent is extended or adjusted under 35 U.S.C. 154(b) by 236 days.

(21) Appl. No.: 17/891,633

(22) Filed: Aug. 19, 2022

(65) Prior Publication Data
US 2023/0069704 A1 Mar. 2, 2023

(30) Foreign Application Priority Data
Aug. 26, 2021 (FR) ..................... 2108920

(51) Int. Cl.
*H04W 16/14* (2009.01)
*H04B 17/318* (2015.01)
(Continued)

(52) U.S. Cl.
CPC .......... *H04W 16/14* (2013.01); *H04B 17/318* (2015.01); *H04W 24/10* (2013.01); *H04W 84/10* (2013.01)

(58) Field of Classification Search
CPC ..... H04W 16/14; H04W 24/10; H04W 84/10; H04B 17/318; H04L 45/24; H04L 45/302; H04L 45/02
USPC .................................. 370/392, 389
See application file for complete search history.

(56) References Cited

U.S. PATENT DOCUMENTS

2012/0177057 A1* 7/2012 Hemli ............... H04L 45/1283
                                                                370/406
2012/0230343 A1* 9/2012 Schrum, Jr. ........... H04L 61/103
                                                                370/401
2019/0296797 A1 9/2019 Teboulle et al.

FOREIGN PATENT DOCUMENTS

CN          108401041 A   *   8/2018   ............. G08C 17/02

OTHER PUBLICATIONS

Anil Mengi; "Narrowband OFDM PLC specifications for G3-PLC networks;" Rapporteur Group Meeting—C; Study Period 2017-2021; Telecommunication Standardization Sector, International Telecommunication Union; 2021; pp. 1-277; retrieved from the Internet: URL:https://www.itu.int/ifa/t/2017/sg15/do cs/rgm/Q18-210308/C/T17-SG15RGM-Q18-210308-C-0018.docx.

(Continued)

*Primary Examiner* — Ricardo H Castaneyra
(74) *Attorney, Agent, or Firm* — Williams Mullen; R. Brian Drozd

(57) ABSTRACT

A method and device for detecting the ability of a neighbouring node to communicate by powerline on a frequency band and by a radio channel in a mesh communication network, wherein each node device sends packets on a frequency band and over the radio channel: generates and sends a frame including a field including primitives, one primitives indicating an address of the node device, another primitives indicating an address of a node device for which the frame does not include any address is intended, checks whether an enhanced beacon frame is received and if so: reads in the frame received an address of a node device for which the frame received is intended, checks whether the address read is identical to its address, identifies the node (Continued)

device that sent the enhanced beacon frame received as a neighbouring node able to communicate by powerline and by radio channel.

8 Claims, 4 Drawing Sheets

(51) Int. Cl.
  *H04W 24/10* (2009.01)
  *H04W 84/10* (2009.01)

(56) References Cited

OTHER PUBLICATIONS

"IEEE Standard for Low-Rate Wireless Networks;" IEEE Standards Association; 2015; Retreived from the Internet: URL:https://ieeexplore. ieee.org/stampPDF/g etPDF.jsp?tp=&arnumber=7460875&ref=aHR0cHM6Ly9pZWVleHBsb3JlLmllZWUub3JnL2RvY3VTZW50Lzc0NjA4NzU=.

IEEE Standard for Local and metropolitan area networks—Part 15.4: Low-Rate Wireless Personal Area Networks (LR-WPANs)Amendment 6: TV White Space Between 54 MHz and 862 MHz Physical Layer; 2013; pp. 1-134; vol. 802.15, No. d5.

Anil Mengi; "Companion Specification: G3-PLC Hybrid PLC & RF Profile;" Study Group 15; Study Period 2017-2020; Telecommunication Standardization Sector; International Telecommunication Union; 2021; pp. 1-50; Retrieved from the Internet: URL:https://www.itu.int/ifa/t/2017/sg15/do cs/rgm/Q18-210308/C/T17-SG15RGM-Q18-210308-C-0010.docx.

Narten et al.; Neighbor Discovery for IP version 6 (IPv6); Network Working Group; 2007; pp. 1-97.

May 12, 2022 Search Report issued in French Patent Application No. 2108920.

* cited by examiner

METHOD FOR DETECTING NEIGHBOURING NODES ABLE TO COMMUNICATE BY POWERLINE AND BY A RADIO CHANNEL

TECHNICAL FIELD

The present invention relates to the field of mesh powerline communication networks and more precisely a method for detecting neighbouring nodes able to communicate by powerline and by a radio channel.

PRIOR ART

Powerline communications PLC are developing, in particular in the context of electrical supply networks of the AMM type (the acronym signifying "automated meter management"). Communication networks are thus implemented in electrical supply networks for the automated collection, by a base node device (also referred to as a "data concentrator") in the network, from smart electricity meters, of energy consumption reading data that said smart electricity meters are respectively responsible for monitoring.

The G3-PLC communication standard is defined to enable the various node devices (in particular data concentrator and smart electricity meters) in such a network to communicate with each other. The standard is specified in the ITU-T recommendation G.9903, which describes in particular the physical layer (PHY) and the data link layer (DLL) of the OSI model (the acronym for "Open Systems Interconnection"). The G3-PLC standard is intended to be used in frequency bands ranging from 10 to 490 kHz. It supports more particularly the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of bit rate, range and resistance to disturbances, in particular.

In a development of the G3-PLC standard defined in an Annex H of the ITU-T recommendation G.9903 (2017) Amendment 1 (May 2021), called G3-PLC Hybrid PLC & RF, an RF (the acronym for radio-frequency) radio channel can be used in place of one of said PLC frequency bands. More precisely, this version of the standard allows the occasional use of a secondary radio physical layer based on a SUN FSK modulation as defined in IEEE 802.15.4:2015. Thus, by using the various G3-PL and RF media for transmitting data, the electrical supply network maximises its coverage and its resilience. An electrical-supply network node capable of sending and receiving data using the two media (PLC and RF) is called a hybrid node.

However, in G3-PLC Hybrid PLC & RF, the choice of communicating between two hybrid nodes in the communication network using either a PLC frequency band or an RF radio channel is determined at the time of construction or reconstruction of the communication routes.

This choice of the communication medium used between two hybrid nodes in the network is generally fixed for several hours.

In addition, the construction or reconstruction of a route uses a large proportion of the bandwidth of the mesh network.

The G3-PLC Hybrid PLC & RF standard defined in Amendment 1 (May 2021) therefore does not make it possible to use all the flexibility offered by PLC/RF hybridisation.

It is therefore desirable to overcome these drawbacks of the prior art.

It is in particular desirable to provide a solution that makes it possible to quickly determine whether a neighbouring node is able to communicate by powerline and by a radio channel and to be able to adapt to the type of communication used by a neighbouring node able to communicate by powerline and by a radio channel.

DISCLOSURE OF THE INVENTION

For this purpose, according to a first aspect, the invention proposes a method for detecting the ability of a neighbouring node to communicate by powerline and by a radio channel in a mesh communication network, the mesh communication network comprising a plurality of node devices using at least powerline communications, characterised in that the method is implemented by each node device able to send packets on at least one frequency band of the electrical supply network using communications by powerline and over the radio channel, and comprises the steps of:
  generating a frame and sending the frame, the frame comprising a field comprising primitives, one of the primitives indicating an address of the node device, another one of the primitives indicating at least one address of a node device for which the frame is intended, the primitive indicating at least one address of a node device for which the frame is intended not comprising any address,
  checking whether an enhanced beacon frame is received and, if so:
  reading in the received frame an address of a node device for which the received frame is intended,
  checking whether the address read is identical to its address,
  identifying the node device that sent the enhanced beacon frame received as a neighbouring node able to communicate by powerline and by radio channel.

The invention also relates to a device for detecting the ability of a neighbouring node to communicate by powerline and by a radio channel in a mesh communication network (120), the mesh communication network (120) comprising a plurality of node devices using at least powerline communications, characterised in that each node device able to send packets on at least one frequency band of the electrical supply network using communications by powerline and over the radio channel comprises:
  means for generating a frame and sending the frame, the frame comprising a field comprising primitives, one of the primitives indicating an address of the node device, another one of the primitives indicating at least one address of a node device for which the frame is intended, the primitive indicating at least one address of a node device for which the frame is intended not comprising any address,
  means for checking whether an enhanced beacon frame is received and, if so:
  means for reading in the received frame an address of a node device for which the received frame is intended,
  means for checking whether the address read is identical to its address, means for identifying the node device that sent the enhanced beacon frame received as a neighbouring node able to communicate by powerline and by a radio channel.

Thus it is possible to quickly determine whether a neighbouring node is able to communicate by powerline.

According to a particular embodiment of the invention, the frame sent and the frame received are enhanced beacon frames as described in the document IEEE 802.15.4:2015.

According to a particular embodiment of the invention, each node device able to send packets on at least one frequency band of the electrical supply network using communications by powerline and over the radio channel can send data according to three operating modes:
- a so-called parallel operating mode wherein the content of the packets sent simultaneously on the at least one frequency band is different from the content of the packets sent over the radio channel,
- a so-called extended operating mode wherein the data to be transmitted are distributed in two groups of data by an operation of interlacing and encoding said data, one group being associated with at least one frequency band and the other group being associated with the radio channel,
- a so-called hyper-robust operating mode wherein the content of the packets sent on the at least one frequency band is identical to the content of the packets sent over the radio channel.

According to a particular embodiment of the invention, firstly the communication mode is determined by each node device by obtaining a link quality indicator for at least one frequency band and for the radio channel and secondly from two packets received simultaneously from another node device able to send packets on at least one frequency band of the electrical supply network using communications by powerline and over the radio channel.

Thus it is possible to adapt to the type of communication used by a neighbouring node able to communicate by powerline and by a radio channel.

According to a particular embodiment of the invention:
- if the link quality indicators for the at least one frequency band and for the radio channel are above predetermined thresholds, the node device uses the parallel mode,
- if one of the link quality indicators for the at least one frequency band and for the radio channel is below a predetermined threshold, the node device uses the extended mode,
- if the link quality indicators for the at least one frequency band and for the radio channel are below the predetermined thresholds, the node device uses the hyper-robust mode.

According to a particular embodiment of the invention, the communication mode is determined by checking whether the packets received are identical and by checking whether a deinterleaving and a decoding of the data of the packets are valid.

The present invention also relates to a computer program product. It comprises instructions for implementing, by a node device, the method according to one of the preceding embodiments, when said program is executed by a processor of the node device.

The present invention also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
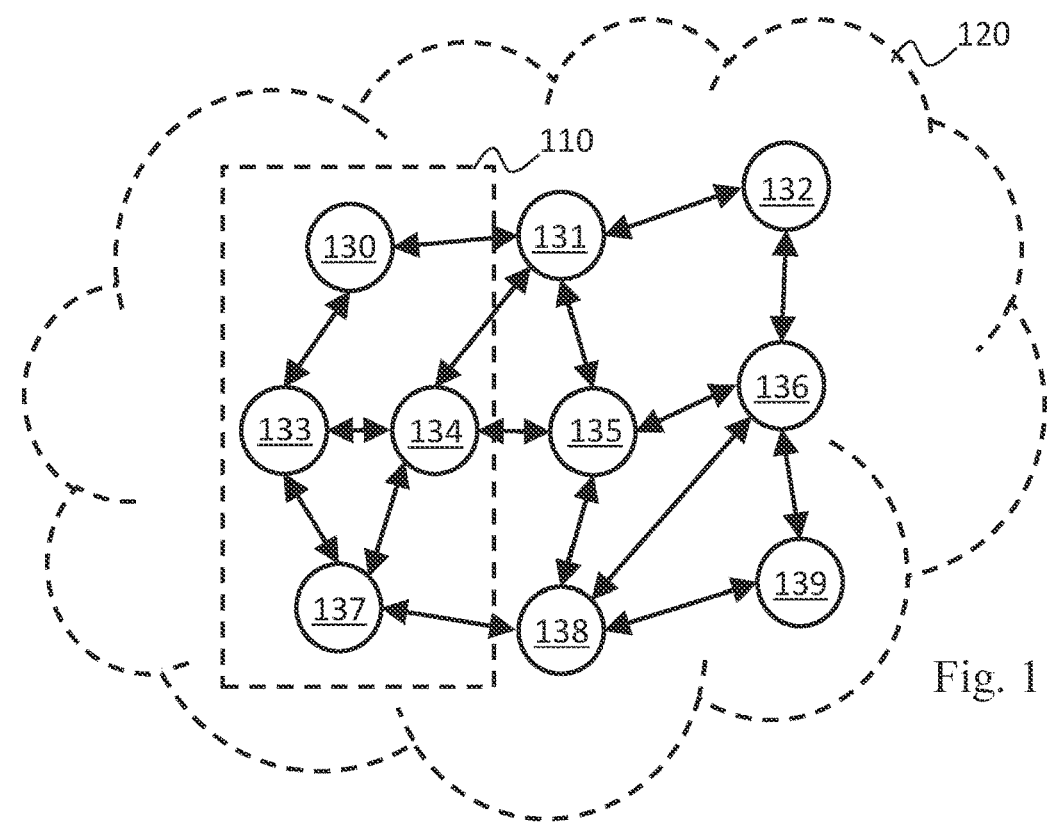
FIG. 1 illustrates schematically a communication network according to one embodiment.

FIG. 1 illustrates schematically a mesh communication network 120. The mesh communication network 120 is for example an electrical supply network of the AMM type. The mesh communication network 120 relies on powerline communications PLC or radio-frequency RF communications for enabling a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of communications in the mesh communication network 120, as detailed below. Thus, one and the same smart electricity meter potentially has available several paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (May 2021) and more particularly in Annex H.

The mesh communication network 120 thus comprises a plurality of node devices 130, 131, 132, 133, 134, 135, 136, 137, 138, 139. A network neighbourhood is associated with each node device in the mesh communication network 120. On FIG. 1, the node device 133 is associated with a network neighbourhood 110 encompassing node devices 130, 134 and 137. This is because, in the mesh communication network 120, a signal or a message broadcast by a node device (such as the node device 133) is in general not visible at every point in said communication network. Each node device sending signals or messages then has a network neighbourhood, i.e. a subset of said mesh communication network 120 wherein any node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type, which rely on a global knowledge of network topology, the routing protocols of the reactive type rely on on-demand route discoveries, each node device in the network then needing solely to have knowledge of its own network neighbourhood to route data in the mesh communication network 120.

The modulation schemes (and corresponding demodulation schemes) applicable are preferentially multicarrier modulation schemes (and respectively demodulation schemes) of the OFDM type ("Orthogonal Frequency Division Multiplex") for the at least one frequency band or SUN-FSK (Smart Utility Network—Frequency Shift Keying) for the RF radio channel.

In terms of frequency bands that can be used in the context of the implementation of the mesh communication network 120, mention can be made of: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz and the RF radio channel, which ranges approximately from 863 MHz to 870 MHz. It is then possible to use: a first thirty-six carrier modulation scheme in the CENELEC A frequency band; a second sixty-two carrier modulation scheme in the FCC frequency band; a third fifty-four carrier modulation scheme in the ARIB frequency band; a fourth sixteen carrier modulation scheme in the CENELEC B frequency band and a fifth modulation scheme of the SUN-FSK type for the RF radio channel of the G3-PLC Hybrid PLC & RF standard. The SUN-FSK modulation is defined in section 20 of the document IEEE 802.15.4:2015.

Figure 2:
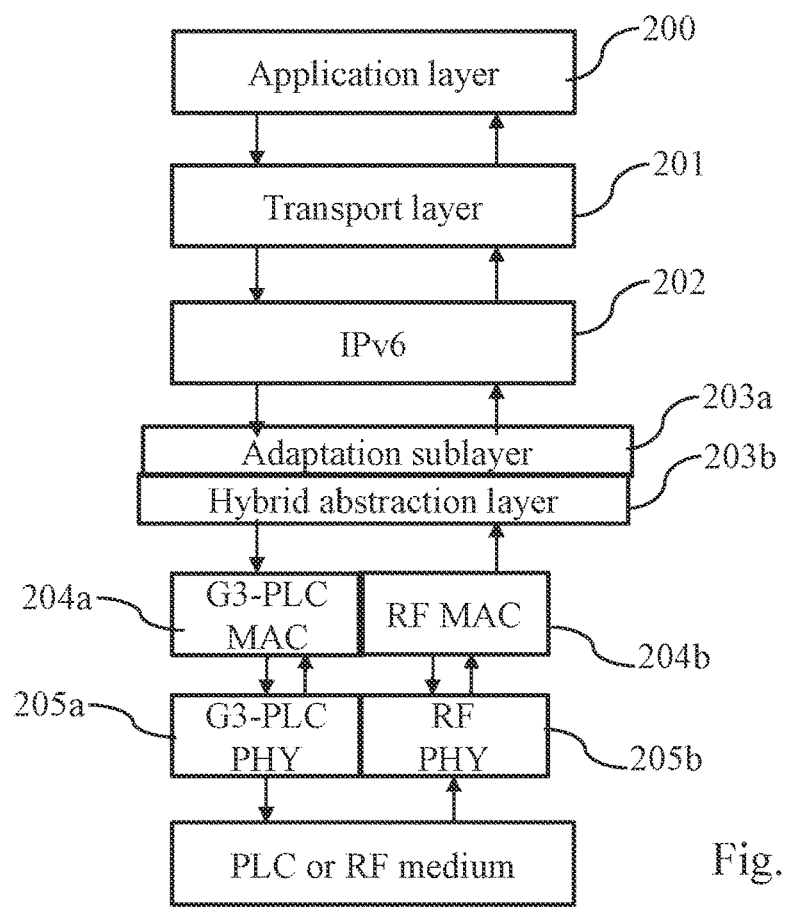
FIG. 2 illustrates schematically the various layers of an OSI model in the particular case of the G3-PLC Hybrid PLC & RF standard.

FIG. 2 illustrates schematically the various layers of an OSI model in the particular case of the G3-PLC Hybrid PLC & RF standard as defined in Annex H of the ITU-T recommendation G.9903 (2017) Amendment 1 (May 2021).

A message to be transmitted coming from an application layer 200 is transmitted to a transport layer 201. The transport layer 201 contains all the protocols responsible for managing errors and controlling the network flows. The two main protocols used are the TCP and UDP protocols. The transport layer 201 creates packets by adding headers to the data coming from the application layer 200. The packets are next transmitted to an IP layer 202, e.g. IPv6. The IP layer 202 encapsulates the packets coming from the transport layer 201 by adding in particular an IP header, e.g. IPv6. An IPv6 packet can do up to 1400 bytes. In the case where the packet has a size above a threshold value, this packet is fragmented into at least two fragments in order to adapt it to the constraints of a MAC sublayer 204a or 204b, in particular to the size of the MAC frames.

For this purpose, the G3-PLC Hybrid PLC & RF standard incorporates the 6LoWPAN protocol, which makes it possible to adapt IPv6 data packets to the constraints of the MAC sublayers 204a or 204b, in particular by fragmenting them. This is because the MAC frames used are of much lower sizes (400 bytes maximum available per packet for the IP part) than the IPv6 packets of 1400 bytes.

An adaptation sublayer 203a incorporating the 6LoWPAN protocol and located between the IP network layer 202 and the MAC sublayer 204a or 204b of the OSI model receives, from the IP network layer 202, IPv6 packets of 1280 bytes and where applicable fragments them. Naturally, in the case of an IP packet that is sufficiently small to be contained in a single MAC G3-PLC or MAC RF frame, no fragmentation is performed.

A hybrid abstraction layer 203b next transfers the fragment or the IP packet in the case of absence of fragmentation to the appropriate MAC sublayer 204a or 204b according to the medium selected for transmission thereof. Hereinafter the term fragment is used for designating both a fragment obtained from a fragmented IP packet or the IP packet itself in the case of absence of fragmentation.

Transmitting a fragment on the PLC medium, i.e. on the powerline, conventionally comprises various steps, in particular a segmentation of the fragments in order to adapt them to a G3-PLC PHY physical layer 205a and an OFDM modulation of the signal. The segmentation consists in partitioning a MAC frame into PSDUs (the English acronym for "PHY Service Data Unit"). All the PSDUs coming from one and the same fragment are modulated using the same modulation scheme.

Transmitting a fragment by radio frequency over the RF channel comprises various steps, in particular a segmentation of the fragments in order to adapt them to an RF PHY physical layer 205b and a SUN-FSK modulation of the signal. As in the PLC case, the segmentation consists in partitioning a MAC frame into PSDUs (the English acronym for "PHY Service Data Unit"). All the PSDUs coming from one and the same fragment are modulated using the same modulation scheme. The specification of the RF PHY physical layer is given in sections 10, 11 and 20 of IEEE 802.15.4-2015 as amended by IEEE 802.15.4v:2017 and supplemented by Table H-5-1 of the ITU-T recommendation G.9903 (2017) Amendment 1 (May 2021).

Figure 3:
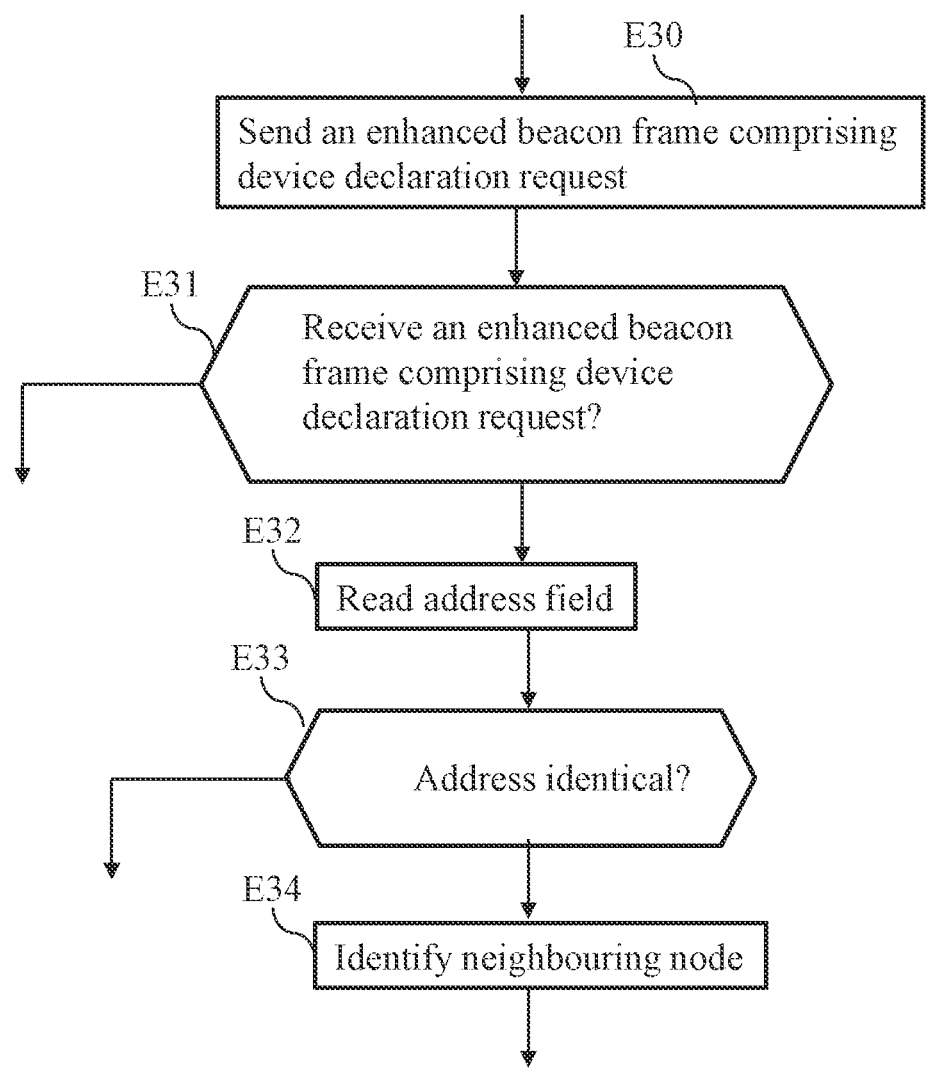
FIG. 3 illustrates schematically a method for detecting the ability of a neighbouring node to communicate by powerline and by a radio channel.

FIG. 3 illustrates schematically a method for detecting the ability of a neighbouring node to communicate by powerline and by a radio channel.

The algorithm is executed periodically, for example every 10 minutes.

At the step E30, a node device able to communicate by powerline and by a radio channel instructs the RF MAC layer 204 for generating an enhanced beacon frame and sending the enhanced beacon frame. The enhanced beacon frame is for example a frame as described in the document IEEE 802.15.4:2015. The enhanced beacon frame comprises a field comprising primitives as described in paragraph 8.2.24 of the document IEEE 802.15.4-2015.

The primitives comprise a field denoted coordAddrMode indicating the addressing mode of the concentrator to which the node device is connected, a field denoted CoodPanid indicating the identifier of the node device in the mesh network, a field denoted CoordAddress that indicates the address of the node device sending the enhanced beacon frame, a field DaAddrlist that indicates the addresses of the nodes for which the enhanced beacon frame is intended. According to the invention the field DaAddrlist that indicates the addresses of the nodes for which the frame is intended is empty.

At the step E31, the node device able to communicate by powerline and by a radio channel checks whether an enhanced beacon frame is received in response to the enhanced beacon frame sent at the step E30.

If so, the node device able to communicate by powerline and by a radio channel passes to the step E32. If not, the node device able to communicate by powerline and by a radio channel interrupts the present algorithm.

At the step E32, the node device able to communicate by powerline and by a radio channel reads in the enhanced beacon frame received, the address included in the field DaAddrlist is identical to its address.

At the step E33, the node device able to communicate by powerline and by a radio channel checks whether the address included in the field DaAddrlist read at the step E32 is identical to its address. In other words, the node device able to communicate by powerline and by a radio channel checks whether the address included in the field DaAddrlist read at the step E32 is the address of the node device that sent the frame the primitive of which indicating at least one address of a node device for which the frame is intended does not comprise any address.

If so, the node device able to communicate by powerline and by a radio channel passes to the step E34. If not, the node device able to communicate by powerline and by a radio channel interrupts the present algorithm.

At the step E34, the node device able to communicate by powerline and by a radio channel identifies the node device that sent the enhanced beacon frame received at the step E31 as a neighbouring node able to communicate by powerline and by a radio channel.

It should be noted here that only the node device that sent the enhanced beacon frame at the step E30 identifies the node device that sent the enhanced beacon frame received at the step E31 as a neighbouring node able to communicate by powerline and by a radio channel.

The node device that sent the enhanced beacon frame received at the step E31 to know whether the node device that sent the enhanced beacon frame at the step E30 must execute the present algorithm.

Figure 4:
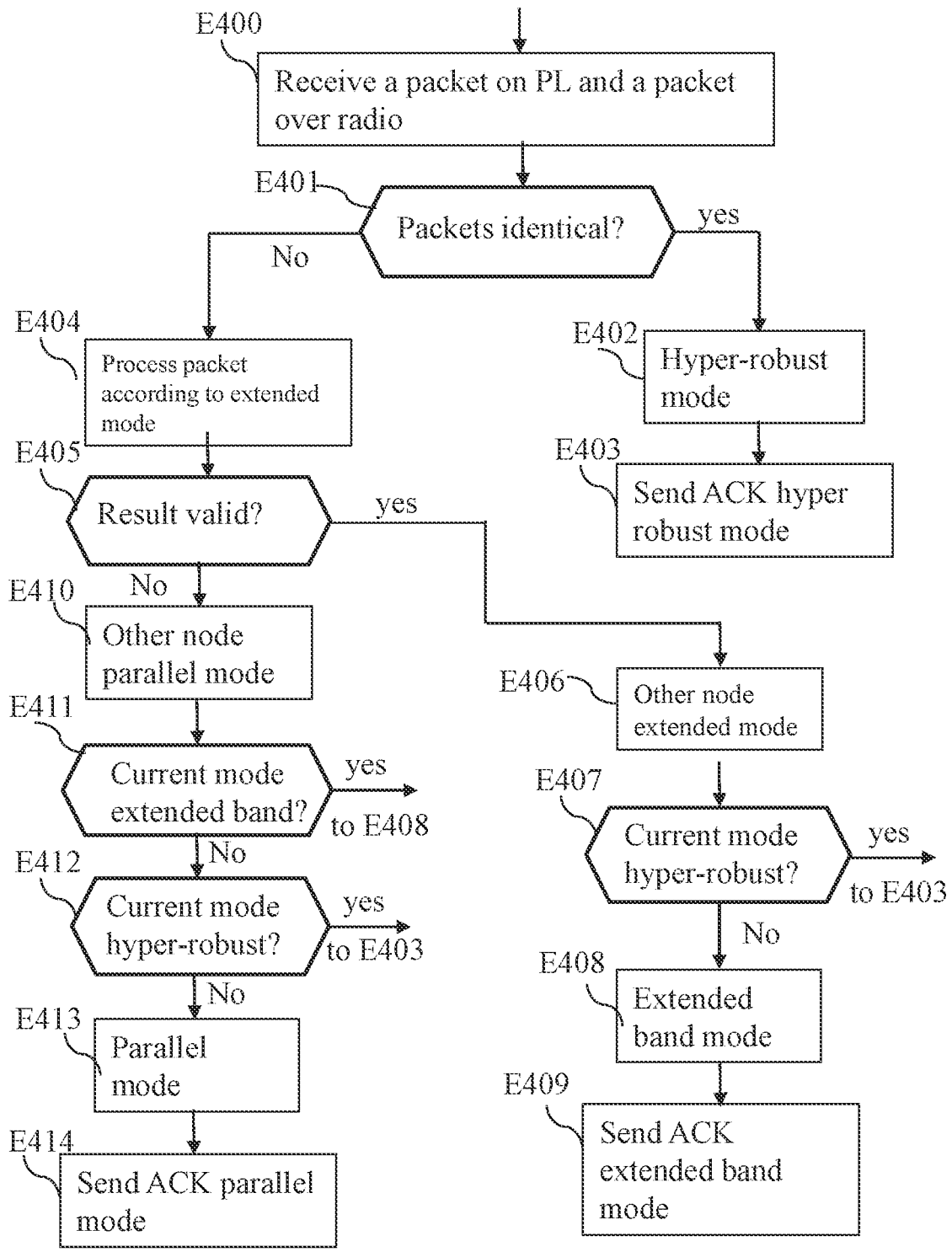
FIG. 4 illustrates schematically a method for adapting to the type of communication used by a neighbouring node able to communicate by powerline and by a radio channel.

FIG. 4 illustrates schematically a method for adapting to the communication type used by a neighbouring node able to communicate by powerline and by a radio channel.

According to the invention, the node devices able to communicate by powerline and by a radio channel can send data in accordance with three operating modes.

Each node device obtains a link quality indicator LQI for at least one frequency band and for the radio channel and determines its operating mode.

If the link quality indicators for the at least one frequency band and for the radio channel are above predetermined thresholds, the node device uses the at least one frequency band and the radio channel for simultaneously transferring packets. The content of the packets sent on the at least one frequency band is different from the content of the packets sent over the radio channel. This mode is hereinafter referred to as parallel mode.

If the link quality indicators for the at least one frequency band and for the radio channel are below predetermined thresholds, the node device uses the at least one frequency band and the radio channel for simultaneously transferring packets. The content of the packets sent on the at least one frequency band is identical to the content of the packets sent over the radio channel. This mode is hereinafter referred to as hyper-robust mode.

If one of the link quality indicators for the at least one frequency band and for the radio channel is below one of the predetermined thresholds, the node device distributes the data to be transmitted into two groups of data by an operation of interlacing and encoding said data, each group being associated with a communication medium from powerline and radio channel, and transmits each data item to a MAC layer of the communication medium associated with the group to which said data item belongs. This mode is hereinafter referred to as extended mode.

The algorithm in FIG. 4 if necessary enables a node device to adapt the communication type that it determines to the communication type used by a neighbouring node able to communicate by powerline and by a radio channel.

At the step E400, the node device able to communicate by powerline and by a radio channel detects the simultaneous reception of a packet on at least one frequency band and of a packet over the radio channel.

At the step E401, the node device able to communicate by powerline and by a radio channel checks whether the contents of the two packets received simultaneously are identical.

If so, the node device able to communicate by powerline and by a radio channel passes to the step E402. If not, the node device able to communicate by powerline and by a radio channel passes to the step E404.

At the step E402, the node device able to communicate by powerline and by a radio channel selects the hyper-robust mode as the operating mode.

At the step E403, the node device able to communicate by powerline and by a radio channel demands the transfer of an acknowledgement over the radio channel and on the at least one frequency band according to hyper-robust mode.

At the step E404, the node device able to communicate by powerline and by a radio channel applies a deinterlacing and a decoding of the data of the data included in the packets simultaneously received.

At the step E405, the node device able to communicate by powerline and by a radio channel checks whether the result of the deinterlacing and of the decoding is valid, for example by checking whether the header part of the result has a format in accordance with the G3 specification.

If so, the node device able to communicate by powerline and by a radio channel passes to the step 406. If not, the node device able to communicate by powerline and by a radio channel passes to the step E410.

At the step E406, the node device able to communicate by powerline and by a radio channel determines that the node device that sent the two packets simultaneously is in the extended mode.

At the step E407, the node device able to communicate by powerline and by a radio channel checks whether its operating mode is the hyper-robust mode.

If so, the node device able to communicate by powerline and by a radio channel passes to the step E403. If not, the node device able to communicate by powerline and by a radio channel passes to the step E408.

At the step E408, the node device able to communicate by powerline and by a radio channel selects the extended mode as the operating mode.

At the step E409, the node device able to communicate by powerline and by a radio channel demands the transfer of an acknowledgement over the radio channel and on the at least one frequency band according to the extended band mode.

At the step E410, the node device able to communicate by powerline and by a radio channel determines that the node device that sent the two packets simultaneously is in the parallel mode.

At the step E411, the node device able to communicate by powerline and by a radio channel checks whether its operating mode is the extended band mode.

If so, the node device able to communicate by powerline and by a radio channel passes to the step E408. If not, the node device able to communicate by powerline and by a radio channel passes to the step E412.

At the step E412, the node device able to communicate by powerline and by a radio channel checks whether its operating mode is the hyper-robust mode.

If so, the node device able to communicate by powerline and by a radio channel passes to the step E403. If not, the node device able to communicate by powerline and by a radio channel passes to the step E413.

At the step E413, the node device able to communicate by powerline and by a radio channel selects the parallel mode.

At the step E409, the node device able to communicate by powerline and by a radio channel demands the transfer of an acknowledgement over the radio channel and of an acknowledgement on the at least one frequency band according to the parallel mode.

Figure 5:
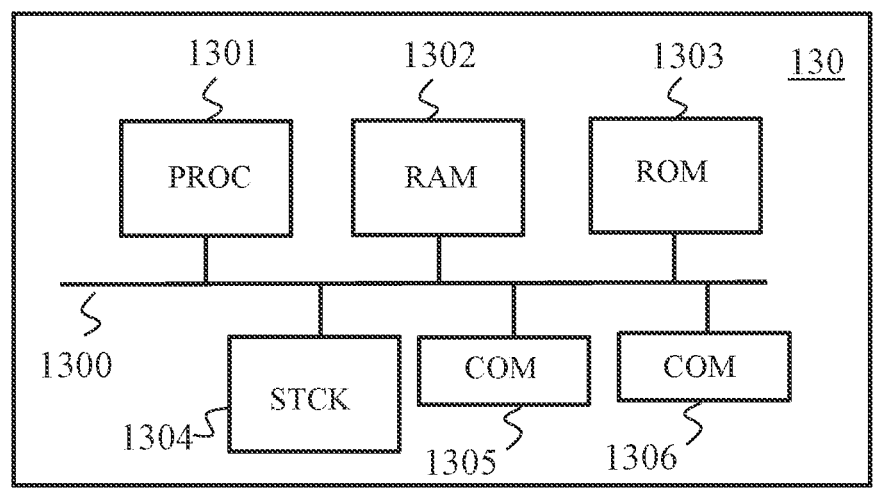
FIG. 5 illustrates schematically an example of hardware architecture of a node device of the communication network according to one embodiment.

FIG. 5 illustrates schematically an example of hardware architecture of a node device of the communication network according to one embodiment.

Such a node device is termed multiband since it is capable of transmitting a message on a plurality of frequency bands. It should be noted that FIG. 5 could also schematically illustrate an example of hardware architecture of a processing module included in the node device.

According to the example of hardware architecture shown in FIG. 5, the node device 130 then comprises, connected by a communication bus 1300: a processor or CPU (central processing unit) 1301; a random access memory RAM 1302; a read only memory ROM 1303; a storage unit such as a hard disk (or a storage medium reader, such as an SD (Secure Digital) card reader 1304; at least one communication interface 1305 enabling the node device 130 to communicate with the node devices belonging to its neighbourhood, e.g. the nodes 131 and 133.

The processor 1301 is capable of executing instructions loaded in the RAM 1302, from the ROM 1303, from an external memory (not shown), from a storage medium (such as an SD card), or from a communication network. When the node device is powered up, the processor 1301 is capable of reading instructions from the RAM 1302 and executing them. These instructions form a computer program causing the implementation, by the processor 1301, of all or some of the methods described in relation to FIGS. 3 and 4.

The methods described below in relation to FIGS. 3 and 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the node device 130 comprises electronic circuitry configured for implementing the method described in relation to FIGS. 3 and 4.

The invention claimed is:

1. A method for detecting the ability of a neighbouring node to communicate by powerline and by a radio channel in a mesh communication network, the mesh communication network comprising a plurality of node devices using at least powerline communications, the method causing each node device able to send packets on at least one frequency band of an electrical supply network using communications by powerline and over the radio channel to perform:

generating a frame and sending the frame, the frame comprising a field comprising primitives, one of the primitives indicating an address of the node device, another one of the primitives indicating at least one address of a node device for which the frame is intended, the primitive indicating the at least one address of the node device for which the frame is intended not comprising any address, checking whether an enhanced beacon frame is received in response to the frame sent and, if so:

reading in the received frame an address of a node device for which the received frame is intended, checking whether the address read is identical to the address of the node device that sent the frame with the primitive which indicates the at least one address of the node device for which the fame is intended does not comprise any address, identifying the node device that sent the enhanced beacon frame received as a neighbouring node able to communicate by powerline and by radio channel.

2. The method according to claim 1, wherein the frame sent and the frame received are enhanced beacon frames as described in the document IEEE 802.15.4:2015.

3. The method according to claim 1, wherein each node device able to send packets on at least one frequency band of the electrical supply network using communications by powerline and over the radio channel can send data according to three operating modes:

a so-called parallel operating mode wherein content of the packets sent simultaneously on the at least one frequency band is different from the content of the packets sent over the radio channel, a so-called extended operating mode wherein data to be transmitted are distributed in two groups of data by an operation of interlacing and encoding said data, one group being associated with at least one frequency band and the other group being associated with the radio channel, a so-called hyper-robust operating mode wherein the content of the packets sent on the at least one frequency band is identical to the content of the packets sent over the radio channel.

4. The method according to claim 3, wherein firstly the communication mode is determined by each node device by obtaining a link quality indicator for at least one frequency band and for the radio channel and secondly from two packets received simultaneously from another node device able to send packets on at least one frequency band of the electrical supply network using communications by powerline and over the radio channel.

5. The method according to claim 4, wherein
if the link quality indicators for the at least one frequency band and for the radio channel are above predetermined thresholds, the node device uses the parallel mode,
if one of the link quality indicators for the at least one frequency band and for the radio channel is below a predetermined threshold, the node device uses the extended mode,
if the link quality indicators for the at least one frequency band and for the radio channel are below the predetermined thresholds, the node device uses the hyper-robust mode.

6. The method according to claim 5, wherein the communication mode is determined by checking whether the packets received are identical and by checking whether a deinterleaving and a decoding of the data of the packets are valid.

7. A non-transitory storage medium that stores a computer program comprising instructions for implementing, by a node device, the method according to claim 1, when the program is executed by a processor of the node device.

8. A device for detecting the ability of a neighbouring node to communicate by powerline and by a radio channel in a mesh communication network, the mesh communication network comprising a plurality of node devices using at least powerline communications, wherein each node device able to send packets on at least one frequency band of an electrical supply network using communications by powerline and over the radio channel comprises circuitry causing the node device to implement:

- generating a frame and sending the frame, the frame comprising a field comprising primitives, one of the primitives indicating an address of the node device, another one of the primitives indicating at least one address of a node device for which the frame is intended, the primitive indicating the at least one address of the node device for which the frame is intended not comprising any address,
- checking whether an enhanced beacon frame is received and, if so:
- reading in the received frame an address of a node device for which the received frame is intended,
- checking whether the address read is identical to its address,
- identifying the node device that sent the enhanced beacon frame received as a neighbouring node able to communicate by powerline and by a radio channel.

* * * * *